G. R. RICHARDSON.
RUNNING GEAR.
APPLICATION FILED AUG. 10, 1921.
1,423,153.
Patented July 18, 1922.
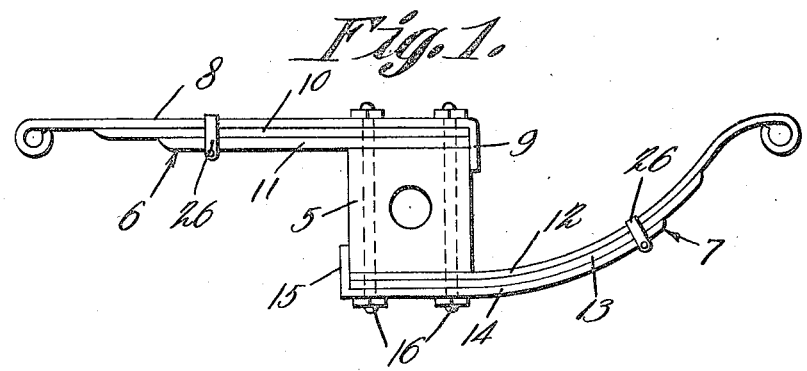
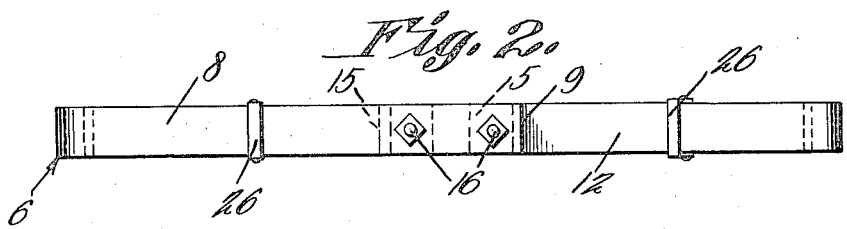
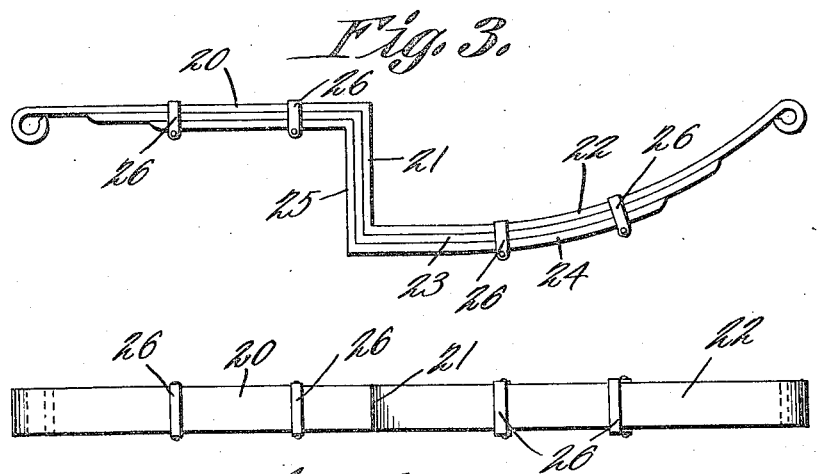

UNITED STATES PATENT OFFICE.

GEORGE R. RICHARDSON, OF DENBIGH, NORTH DAKOTA.

RUNNING GEAR.

1,423,153.  Specification of Letters Patent.  Patented July 18, 1922.

Application filed August 10, 1921. Serial No. 491,253.

*To all whom it may concern:*

Be it known that I, GEORGE R. RICHARDSON, a citizen of the United States, residing at Denbigh, in the county of McHenry and State of North Dakota, have invented a new and useful Running Gear, of which the following is a specification.

This invention has reference to spring devices, and more particularly to a novel form of spring especially constructed for use in connection with motor vehicles or the like, the primary object of the invention being to provide a spring which will compensate for the rebound of the spring, to reduce spring brakes to a minimum.

A further object of the invention is to provide a spring wherein the ends moving in arcs of circles, when pressure is brought thereon, and being so constructed that it may be attached (preferably) to frame of vehicle direct, without shackles or any oscillating connections, and being so arranged that the arcs of circles take up the end expansion and contraction of springs when under pressure, allowing both ends of springs to move parallel downward and backward freely.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a side elevational view of a spring device constructed in accordance with the present invention.

Figure 2 is a plan view of the same.

Figure 3 is a modified form of the invention.

Figure 4 is a plan view of the same.

Referring to the drawing in detail, the reference character 5 designates an axle housing which is provided with suitable openings extending vertically therethrough, and to which axle housing the spring device is connected.

The spring device includes a pair of spring sections 6 and 7 respectively, the section 6 including a main spring 8 which has one end thereof extending at right angles as at 9, the right angled end being designed to contact with one surface of the axle housing 5 and act as an abutment for the leaves 10 and 11.

The section 7 is secured to the lower surface of the axle housing 5 and also includes a main leaf 12, an intermediate leaf 13 and an outer leaf 14, the outer leaf 14 having a right angled extremity 15 contacting with one side of the axle housing 5 and acts as an abutment for the leaves 12 and 13 to prevent movement thereof, laterally of the axle housing 5.

Suitable bolt openings are formed in the spring sections, which openings register with the openings in the axle housing and accommodate the bolts 16 which secure the spring sections to the axle housing. It is to be understood that these spring sections may be secured to the chassis of a motor vehicle in any desired manner, it being preferable however to employ ball and socket joints to accomplish this result.

In the modified form of the invention as illustrated by Figures 3 and 4 of the drawings, the main leaf 20 is provided with a vertical portion 21 and an upwardly curved extremity 22, the vertical portion 21 being constructed to conform to the contour of an axle housing to permit the spring device to be secured thereto.

The auxiliary leaves of the spring device are indicated by the reference characters 23 and 24 respectively, which leaves are also provided with vertical portions 25 to conform with the vertical portion 21 of the main leaf 20.

It might be further stated that the usual spring clips 26 are provided to secure the spring leaves together.

Having thus described the invention, what is claimed as new is:—

A spring vehicle comprising in combination with an axle housing, an upper spring section and a lower spring section, each of said spring sections including a plurality of leaves, one of the leaves of each section having a right angled extremity adapted to engage the axle housing, and means for securing the sections to the axle housing.

In testimony that I claim the foregoing as my own, I have hereto affixed my signature in the presence of two witnesses.

GEO. R. RICHARDSON.

Witnesses:
IVOR H. EIDSNESS,
ED. BROWN.